United States Patent [19]
Seto et al.

[11] Patent Number: 5,545,884
[45] Date of Patent: Aug. 13, 1996

[54] CARD READER APPARATUS

[75] Inventors: Yoshiaki Seto; Masayuki Miyauchi; Takanobu Fujii, all of Tokyo, Japan

[73] Assignee: Tamura Electric Works, Ltd., Tokyo, Japan

[21] Appl. No.: 489,969

[22] Filed: Jun. 13, 1995

[30] Foreign Application Priority Data

Jun. 16, 1994 [JP] Japan .................................. 6-134321

[51] Int. Cl.⁶ .................................................. G06K 7/08
[52] U.S. Cl. ........................................ 235/449; 235/493
[58] Field of Search ..................................... 235/449, 493

[56] References Cited

U.S. PATENT DOCUMENTS 4,431,911  2/1984  Rayburn .......................... 235/449 UX Primary Examiner—Harold Pitts
Attorney, Agent, or Firm—Blakely, Sokoloff, Taylor & Zafman

[57] ABSTRACT

A magnetic card reader apparatus includes a convey unit, a sensor, a buffer, a reading unit, a detection unit, and a calculation unit. The convey unit conveys an inserted prepaid card at a predetermined speed, and the prepaid card has a punch hole formed at a position corresponding to balance information. The sensor samples the punch hole of the prepaid card during conveying of the prepaid card at a predetermined time interval from a leading end side of the prepaid card. The buffer stores sampling data output from the sensor. The reading unit sequentially reads out the sampling data stored in the buffer from sampling data corresponding to a trailing end portion of the prepaid card. The detection unit detects data first representing a punch hole from the sampling data read out from the buffer. The calculation unit calculates a position of the punch hole on the basis of a detection output from the detection unit to detect the balance information of the prepaid card.

9 Claims, 7 Drawing Sheets

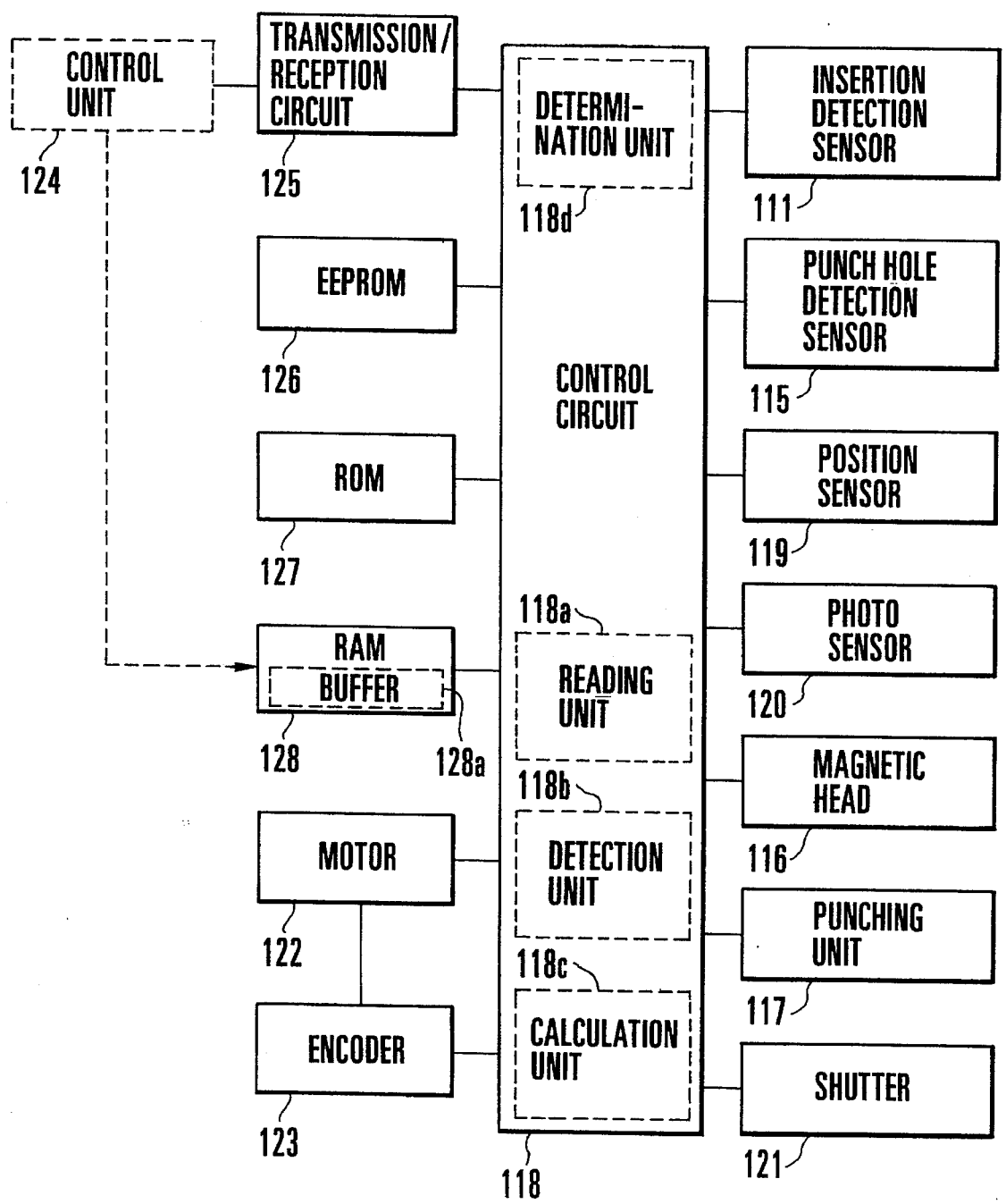
F I G. 2

CARD READER APPARATUS

BACKGROUND OF THE INVENTION

The present invention relates to a card reader apparatus for receiving an inserted prepaid card therein to read balance information and, more particularly, a card reader apparatus for detecting the position of a punch hole formed in a prepaid card to read balance information.

FIG. 6 shows a conventional magnetic card reader/writer apparatus for magnetically recording/reading information from/on a prepaid card on which total information corresponding to a prepaid amount is recorded. Referring to FIG. 6, reference numeral 1 denotes an apparatus main body; 2, an insertion port in which a prepaid card is to be inserted; and 3, a prepaid card (to be referred to as a card hereinafter). In the above arrangement, when the card 3 is inserted in the insertion port 2, the inserted card 3 is detected by an insertion detection sensor 11. In this case, in the apparatus main body 1, when a motor (not shown) is started, and rollers 12 driven by the motor are rotated, the card 3 is conveyed in a convey path 14 by a convey belt 13.

In order to visually indicate balance information on the card 3, a punch hole is formed at a position corresponding to balance information with a decrease in balance information.

More specifically, when a punch hole detection sensor 15 arranged in the convey path 14 detects a punch hole formed in the card 3 conveyed in the convey path 14 to represent the balance of the card 3, and the card 3 is determined as a valid card having a balance, the card 3 is further conveyed to the position of a magnetic head 16 arranged in the convey path 14 like the punch hole detection sensor 15. The magnetic head 16 reads the balance information, of the card, magnetically recorded on a magnetic track (not shown) of the card 3.

At this time, when the read information is proper, and the card 3 has a balance, the card 3 is determined to be used for purchasing an article. When the article is purchased, a balance obtained by settling the charge for the article is recorded on the card 3, a punching unit 17 forms a punch hole at a punch position corresponding to the new balance of the card 3, and the card 3 is returned.

FIG. 7 shows a punch hole portion 31 of the card 3 punched by the punching unit 17. Punch holes are formed at positions corresponding to balances indicated by numbers 0 to 9 of the card 3. More specifically, in an unused card, no punch hole is formed at a position corresponding to any number. In this case, when the card 3 is used by, e.g., one unit amount, a punch hole is formed at the position corresponding to the number 9. Thereafter, punch holes are sequentially formed at the positions corresponding to the numbers 8 to 1 in accordance with use of the card 3. When the card 3 is used, and the balance of the card 3 becomes zero, a punch hole is formed at the position corresponding to the last number 0. As a result, the card 3 is determined as an invalid card.

When the card 3 having a punch hole is inserted into the apparatus main body 1, the apparatus conveys the card 3 at a predetermined speed, the leading end portion of the card 3 is detected by the punch hole detection sensor 15. Subsequently, a detection output from the punch hole detection sensor 15 is sampled/input at a predetermined time interval. As shown in FIG. 8A, sampling results are sequentially stored in a buffer (not shown) from the sampling result of punch hole data at the position corresponding to the number 9 of the leading end portion of the card. In the example in FIG. 8A, reference symbols $\underline{a}$ and $\underline{b}$ respectively denote the storage areas of sampling data corresponding to the leading end portion (number 9 side) and the trailing end (number 0 side). In addition, "1" denotes punch hole data. The punch hole data corresponding to the numbers 9 and 8 of the punch hole portion 31 are stored in areas $\underline{c}$ and $\underline{d}$ of the buffer, respectively. Note that "0"s of the area $\underline{a}$ to the area immediately before the area $\underline{c}$ represent the sampling result of an edge area extending from the leading end of the card 3 to the punch hole portion 31, "0"s between the areas $\underline{c}$ and $\underline{d}$ represent the sampling result of an interval area between the numbers 9 and 8.

However, after the card 3 is inserted in the insertion port 2, when the card 3 is not properly received into the apparatus because a user temporarily holds the trailing end portion of the card 3 with his/her fingers against a convey force, the punch hole data of the card 3 is stored in the buffer like the data shown in FIGS. 8B and 8C. Such a phenomenon occurs when, in an apparatus having a small depth and the punch hole detection sensor 15 arranged near the insertion port, a user performs a wrong operation such that the information of the card 3 is read while the user inserts the card 3 and keeps holding the trailing end portion of the card 3. The apparatus recognizes, as an illegal card, the card 3 inserted by the above operation. For this reason, the utilization efficiency of the apparatus is degraded, and the apparatus is unpopular among users.

More specifically, when the card 3 is temporarily held by the insertion port 2, punch hole data, of the numbers 9 and 8, to be stored in the areas $\underline{c}$ and $\underline{d}$ as shown in FIG. 8A are stored in the areas $\underline{d}$ and $\underline{e}$ in FIG. 8B, and are stored in the areas $\underline{c}$ and $\underline{e}$ in FIG. 8C. That is, balance information different from that of an actual punch position is stored in the buffer. For this reason, balance information based on the punch hole data read from the buffer does not coincide with balance information constituted by magnetic information read from the card 3. As a result, the card 3 is disadvantageously returned as an illegal card (counterfeit card).

SUMMARY OF THE INVENTION

It is an object of the present invention to provide a card reader apparatus for accurately detecting the punch hole position of a card received into the apparatus even when the card is not properly received into the apparatus because the trailing end portion of the card is temporarily held by a user in insertion of the card.

It is another object of the present invention to provide a card reader apparatus for preventing a proper card from being returned as an illegal card even when the card is not properly received into the apparatus because the trailing end portion of the card is temporarily held by a user in insertion of the card.

In order to achieve the above objects, according to the present invention, there is provided a magnetic card reader apparatus comprising convey means for conveying an inserted prepaid card at a predetermined speed, the prepaid card having a punch hole formed at a position corresponding to balance information, sensor means for sampling the punch hole of the prepaid card during conveying of the prepaid card at a predetermined time interval from a leading end side of the prepaid card, memory means for storing sampling data output from the sensor means, reading means for sequentially reading out the sampling data stored in the memory means from sampling data corresponding to a trailing end portion of the prepaid card, detection means for detecting data first representing a punch hole from the sampling data read out from the memory means, and calculation means for calculating a position of the punch hole on the basis of a detection output from the detection means to detect the balance information of the prepaid card.

BRIEF DESCRIPTION OF THE DRAWINGS

FIG. 2 is a block diagram showing the magnetic card reader/writer apparatus according to the embodiment shown in FIG. 1;

FIGS. 3A to 3C are views showing card sampling data stored in a buffer in FIG. 1;

Figures 8A, 8B, 8C:
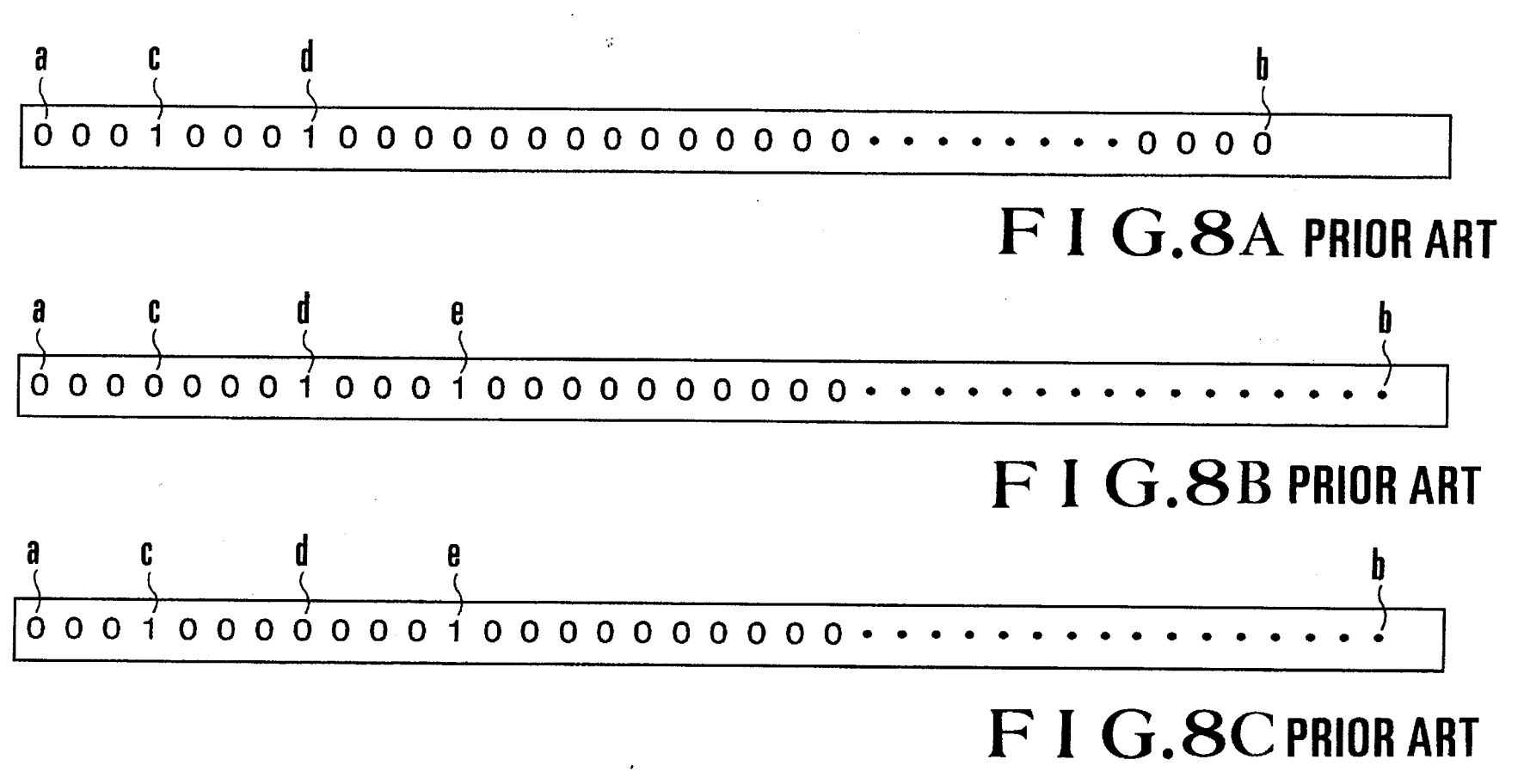

FIGS. 8A to 8C are views showing conventional card sampling data to be stored in a buffer.

DESCRIPTION OF THE PREFERRED EMBODIMENT

The present invention will be described below with reference to the accompanying drawings.

Figure 1:
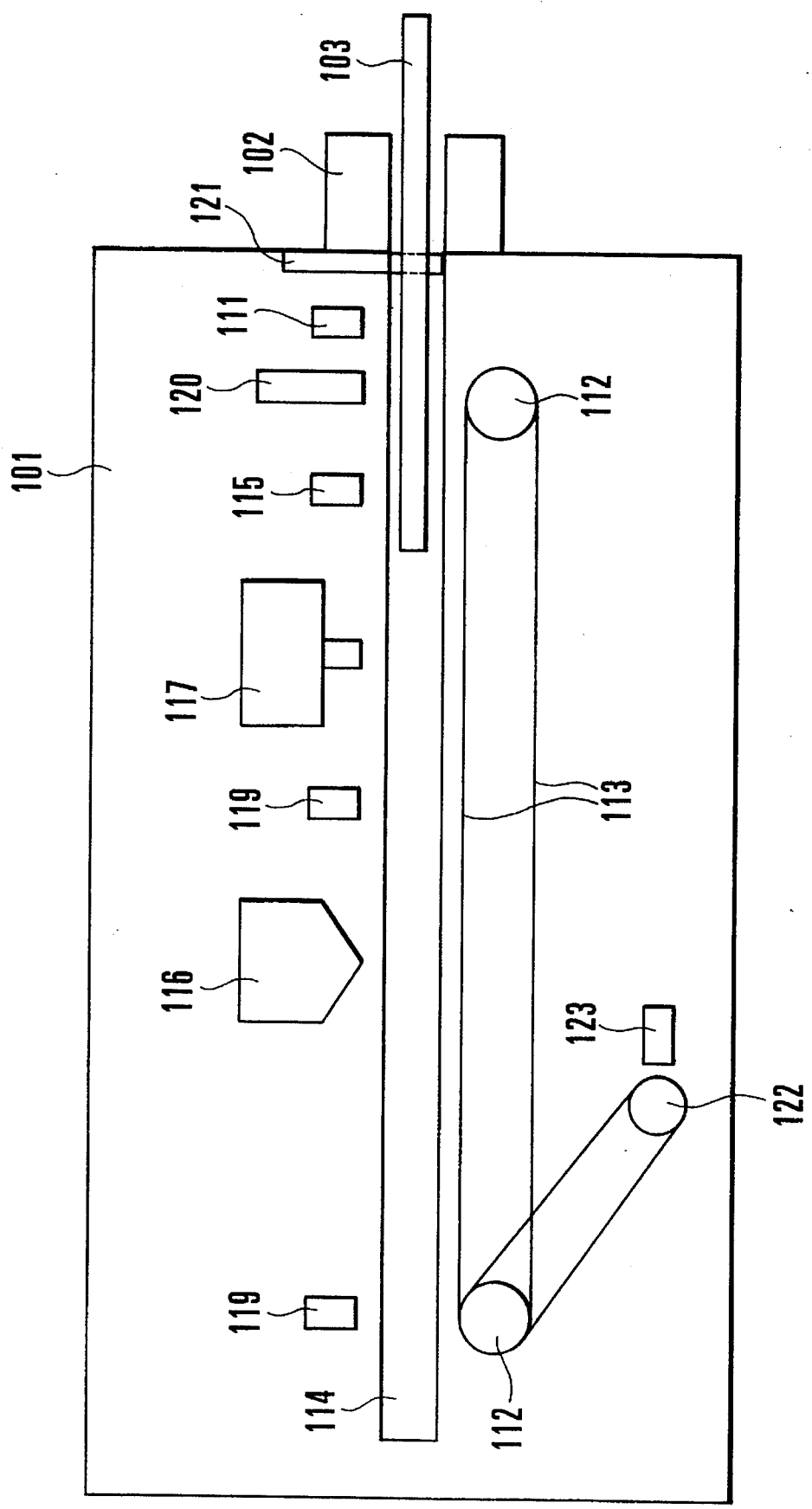
FIG. 1 is a schematic view showing the arrangement of a magnetic card reader/writer apparatus according to an embodiment of the present invention.

FIG. 1 shows the arrangement of a magnetic card reader/writer apparatus according to an embodiment of the present invention. Referring to FIG. 1, reference numeral 101 denotes an apparatus main body; 102, an insertion port in which a prepaid card is to be inserted; 103, a prepaid card (to be referred to as a card hereinafter) constituted by a magnetic card; 111, an insertion detection sensor for detecting insertion of the card 103 in the insertion port 102; 114, a convey path, communicating with the insertion port 102, for conveying the card 103 inserted from the insertion port 102; 120, a photosensor, arranged immediately behind the insertion detection sensor 111, for reading a bar code representing management information recorded on the card 103 in advance; and 115, a punch hole detection sensor arranged behind the photosensor 120 to face the convey path 114. The distance between the punch hole detection sensor 115 and the insertion port 102 is set to be shorter than the overall length of the card 103. Reference numeral 117 denotes a punching unit, arranged behind the punch hole detection sensor 115, for forming a punch hole in the card 103 conveyed on the convey path 114; 116, a magnetic head, arranged behind the punching unit, for magnetically writing/reading information on/from the card conveyed on the convey path 114; and 119, a plurality of position sensors for detecting the position of the card 103 in the convey path 114.

Reference numeral 113 denotes a convey belt, looped between a pair of rollers 112, for conveying the card; 122, a motor for driving the rollers 112 and the convey belt 113; 123, an encoder for detecting the rotational speed of the motor 122 to calculate the convey distance of the prepaid card 3; and 121, a shutter, arranged at the insertion port 102, for preventing two or more cards 103 from simultaneously being inserted into the convey path 114.

FIG. 2 shows the magnetic card reader/writer apparatus shown in FIG. 1. Referring to FIG. 2, reference numeral 118 denotes a control circuit such as a CPU (Central Processing Unit) or the like for controlling the entire apparatus. The insertion detection sensor 111, the punch hole detection sensor 115, the position sensors 119, the photosensor 120, the magnetic head 116, the punching unit 117, the shutter 121, the motor 122, and the encoder 123, all of which are shown in FIG. 1, are connected to the control circuit 118. The control circuit 118 comprises a reading unit 118a for sequentially reading out sampling data stored in a buffer 128a from sampling data corresponding to the trailing end portion of the card 103, a detection unit 118b for detecting data first representing a punch hole from the sampling data read out from the buffer 128a, a calculation unit 118c for calculating the position of the punch hole on the basis of a detection output from the detection unit 118b to detect balance information of the card 103, and a determination unit 118d which, during a reading operation for the card 103, determines the card 103 as a proper card when (balance based on punch hole)≧(balance based on magnetic information), and determines the card as an illegal card when (balance based on punch hole)<(balance based on magnetic information). The control circuit 118 controls the convey distance of the card 103 on the convey path 114 on the basis of an output from the encoder 123.

In addition, a transmission/reception circuit 125 for transmitting/receiving data to/from a control unit 124 serving a host apparatus, an EEPROM (Electrically Erasable and Programmable Read Only Memory) 126 for storing the various data, error information, and the like of the apparatus, a ROM (Read Only Memory) 127 for storing a program executed by the control circuit 118, and a RAM (Random Access Memory) 128 for storing data and the like are connected to the control circuit 118. The data of the RAM 128 is backed up by a power supply from the control unit 124.

In the card reader apparatus arranged as described above, when the card 103 is inserted in the insertion port 102 of the apparatus, insertion of the card 103 is detected by the insertion detection sensor 111. In this manner, the control circuit 118 starts the motor 122 and sends the card 103 into the convey path 114, and the bar code of the card 103 is read by the photosensor 120, thereby identifying the card. The control circuit 118 causes the punch hole detection sensor 115 to detect a punch hole of the card 103. If the punch hole can be properly detected, the control circuit 118 conveys the card 103 to the position of the magnetic head 116. The control circuit 118 causes the magnetic head 116 to read information representing the balance, of the card 103, magnetically recorded on the card 103. If the information is properly recorded on the card 103, the card 103 is permitted to be used.

When an article is purchased using the card 103, the magnetic head 116 is driven to record a balance obtained by settling the charge for the article on the card 103, and the punching unit 117 is driven to form a punch hole at a punch position representing the new balance information of the card 103, thereby returning the card 103.

Figure 7:
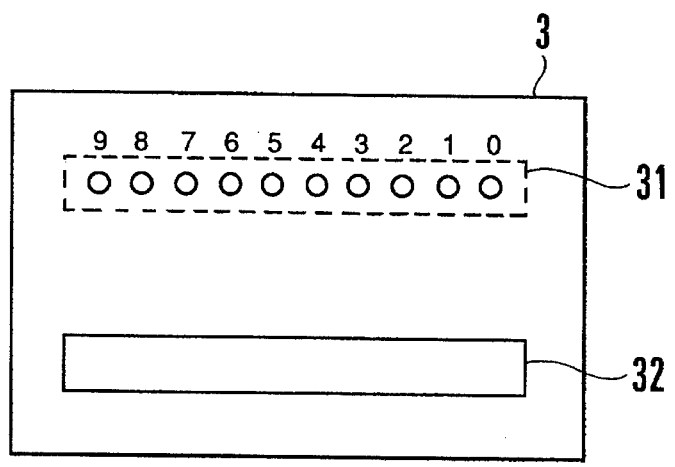
FIG. 7 is a plan view showing a card.
Figure 1:
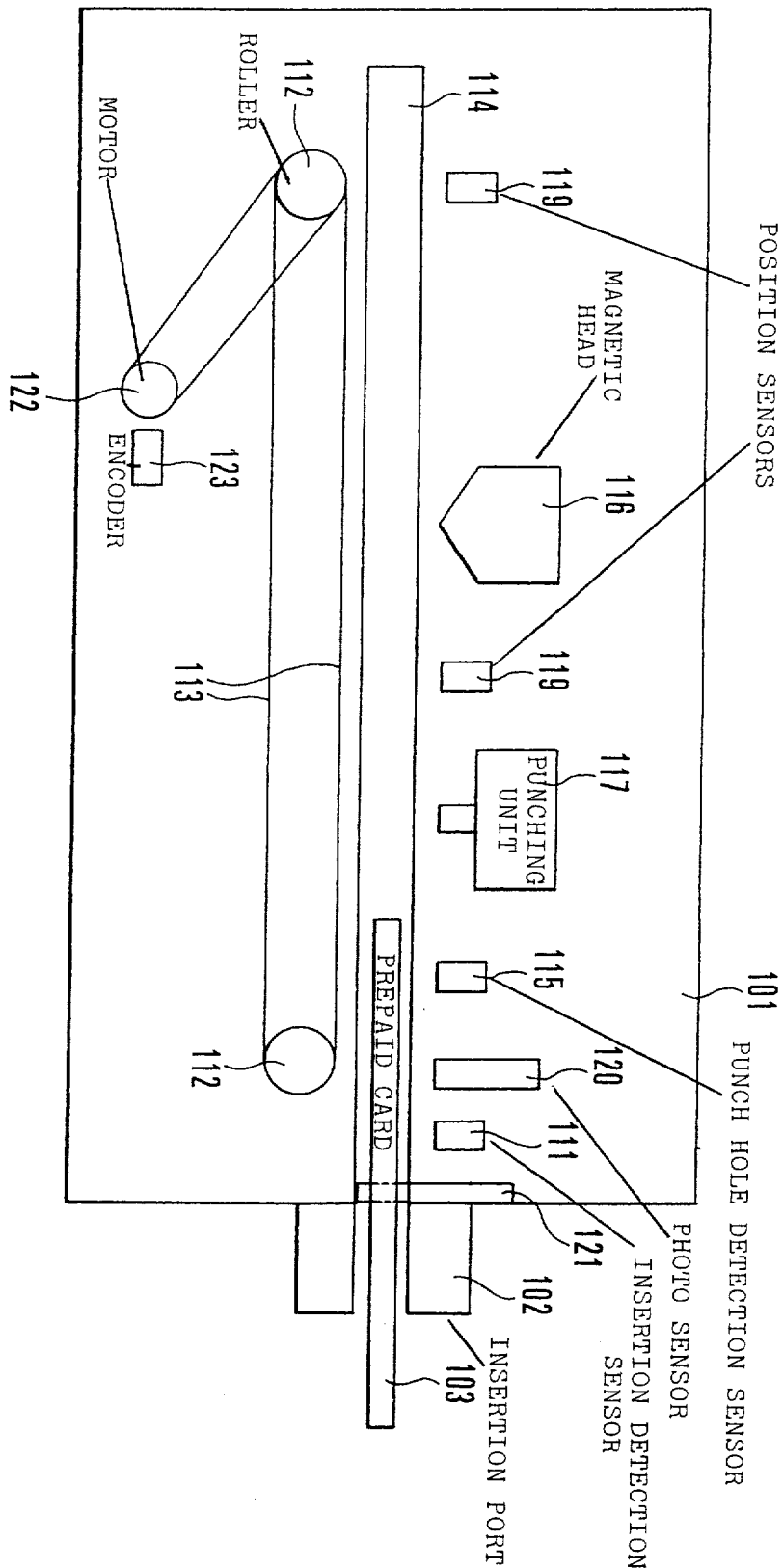

When the card 103 is received into the convey path 114, and the leading end portion of the card 103 is detected by the punch hole detection sensor 115, the control circuit 118 subsequently causes the punch hole detection sensor 115 to sequentially sample a punch hole portion 31 shown in FIG. 7 at a predetermined time interval. The obtained data are sequentially stored as sampling data in the buffer 128a constituted by a predetermined area of the RAM 128.

Figures 3A, 3B, 3C:
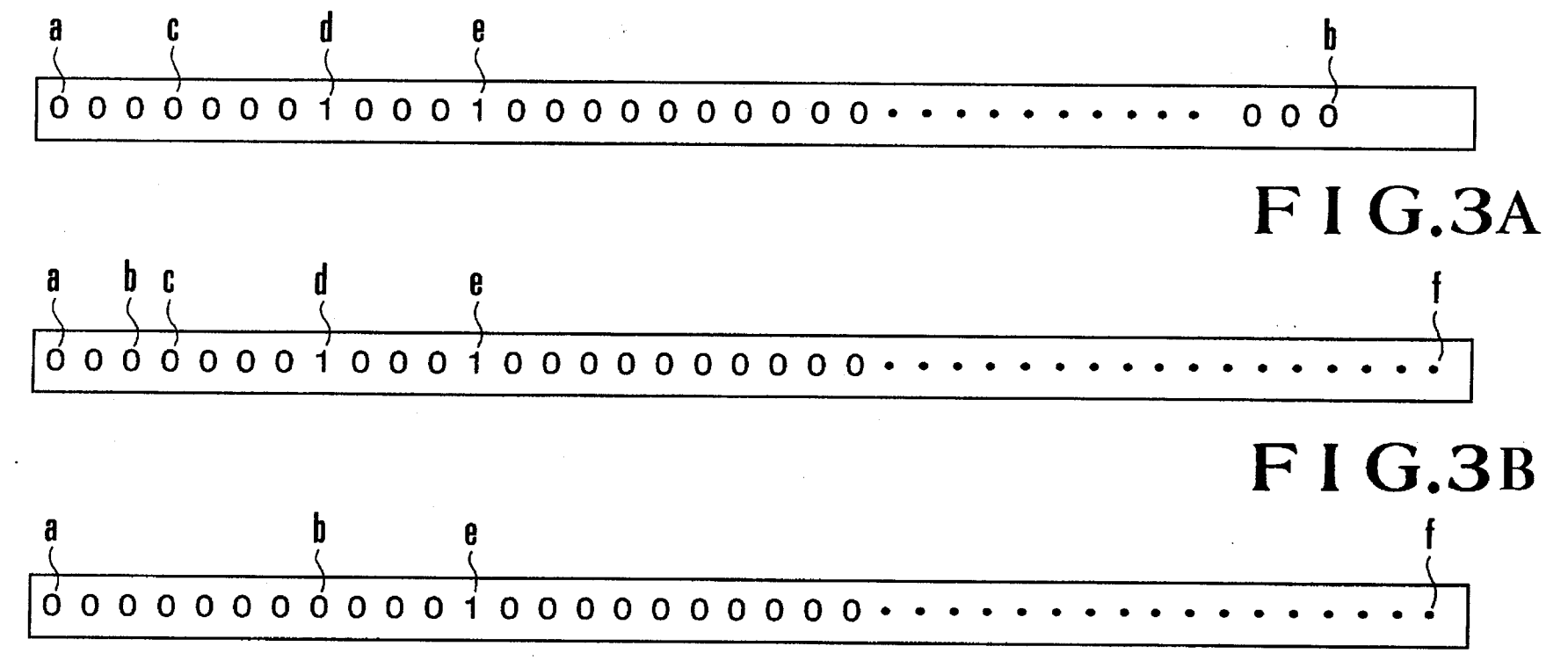

However, when the trailing end portion of the card 103 inserted into the insertion port 102 is held by a user against the convey force to temporarily stop feeding the card 103 through the insertion port 102, sampling data shown in FIGS. 3A to 3C are stored in the buffer 128*a*. Note that, in FIGS. 3A to 3C, it is assumed that reference symbols a denote storage areas for data corresponding to the leading end of the card 103 and that reference symbols b denote storage areas for data corresponding to the trailing end of the card 103. In addition, each "1" represents punch hole data representing that a punch hole is formed, and each "0" represents punch hole absence data representing that a punch hole is not formed.

More specifically, as described above, in the card 103, assume that punch holes are formed in portions corresponding to the numbers 9 and 8 of the punch hole portion 31. In this case, when the card 103 is properly received, punch hole data "1" of the sampling data must be stored in the areas c and d of the buffer 128*a* shown in FIG. 3A. However, when the card 103 is inserted in the insertion port 102, and the leading end portion of the card 103 is detected by the punch hole detection sensor 115, the trailing end portion of the card 103 is held by the user to prevent the card 103 from being received into the apparatus. Thereafter, when the card 103 is released at a timing corresponding to storage of the data in the area c, as shown in FIG. 3A, punch hole data "1" corresponding to the number 9 in FIG. 7 is stored in the area d, and punch hole data "1" corresponding to the number 8 is stored in an area e.

As a result, when the control circuit 118 checks the sampling data, which is shown in FIG. 3A and stored in the buffer 128*a*, from the leading end side of the card 103, the control circuit 118 determines that punch holes are formed in the portions corresponding to the numbers 8 and 7, thereby causing erroneous detection.

In order to eliminate the above drawback, according to the present invention, the sampling data stored in the buffer 128*a* are read from the trailing end side of the card 103 to make it possible to accurately detect the position of the punch hole.

In addition, when the user keeps holding the trailing end portion of the card 103 inserted into the apparatus to make it impossible to receive the card 103 into the apparatus for a predetermined period of time, the buffer 128*a* for storing the sampling data may be filled with the sampling data. Therefore, according to the present invention, in consideration of this case, a ring-type buffer is used as the buffer 128*a*.

FIGS. 3B and 3C show the states of sampling data stored in the ring-type buffer 128*a* when the user keeps holding the trailing end portion of the card 103 inserted into the apparatus.

More specifically, in FIG. 3B, as in FIG. 3A, while the trailing end portion of the inserted card 103 is held, sampling data are sequentially stored at a predetermined time interval from an area a corresponding to the leading end portion of the card 103, and the card 103 is released when punch hole data is stored in an area c. In this case, the control circuit 118 stores punch hole data "1" corresponding to the numbers 8 and 9 in areas d and e, respectively. Thereafter, when punch hole absence data "0" are stored in the buffer 128*a* up to an area f to fill the buffer with data, subsequently input sampling data are overwritten in the buffer 128*a* from the area a again. After the sampling data of the trailing end portion of the card 103 is stored in an area b, a buffering operation is ended.

In such a case, data are sequentially read out in an order indicated by area b→area a→area f→area e→area d from the sampling data, of the trailing end portion of the card 103, stored in the area b, thereby accurately detecting punch hole data "1".

The trailing end portion of the card 103 is held for a time longer than that of the case shown in FIG. 3B, and the card 103 is released. In this case, as shown in FIG. 3C, sampling data are stored in the areas a to f, and sampling data are sequentially overwritten from the area a again. Thereafter, data corresponding to the trailing end portion of the card 103 is stored in the area b. In this case, in FIG. 3C, punch hole data "1" at the position of the area d (FIG. 3A) corresponding to the number 9 on the leading end side of the card 103 is erased by overwriting the sampling data in the area b of the trailing end portion of the card 103.

In this case, when the data are sequentially read out from the sampling data, of the trailing end portion of the card 103, stored in the area b, only punch hole data stored in the area e and corresponding to the number 8 is accurately detected. At this time, in checking whether the card 103 is proper or illegal, if balance information corresponding to the number 8 is smaller than balance information corresponding to the number 9 can be accurately detected, the detection operation is satisfactorily used as an operation for detecting the balance of the card 103. Therefore, in this case, the card 103 is not determined as a counterfeit card.

More specifically, the determination unit 118*d* of the control circuit 118 determines the card 103 as a proper card when (balance based on punch hole)≧(balance based on magnetic information), and determines the card 103 as an illegal card when (balance based on punch hole)<(balance based on magnetic information). In this manner, the card 103 is permitted to be used, or the card 103 is returned.

Figure 4:
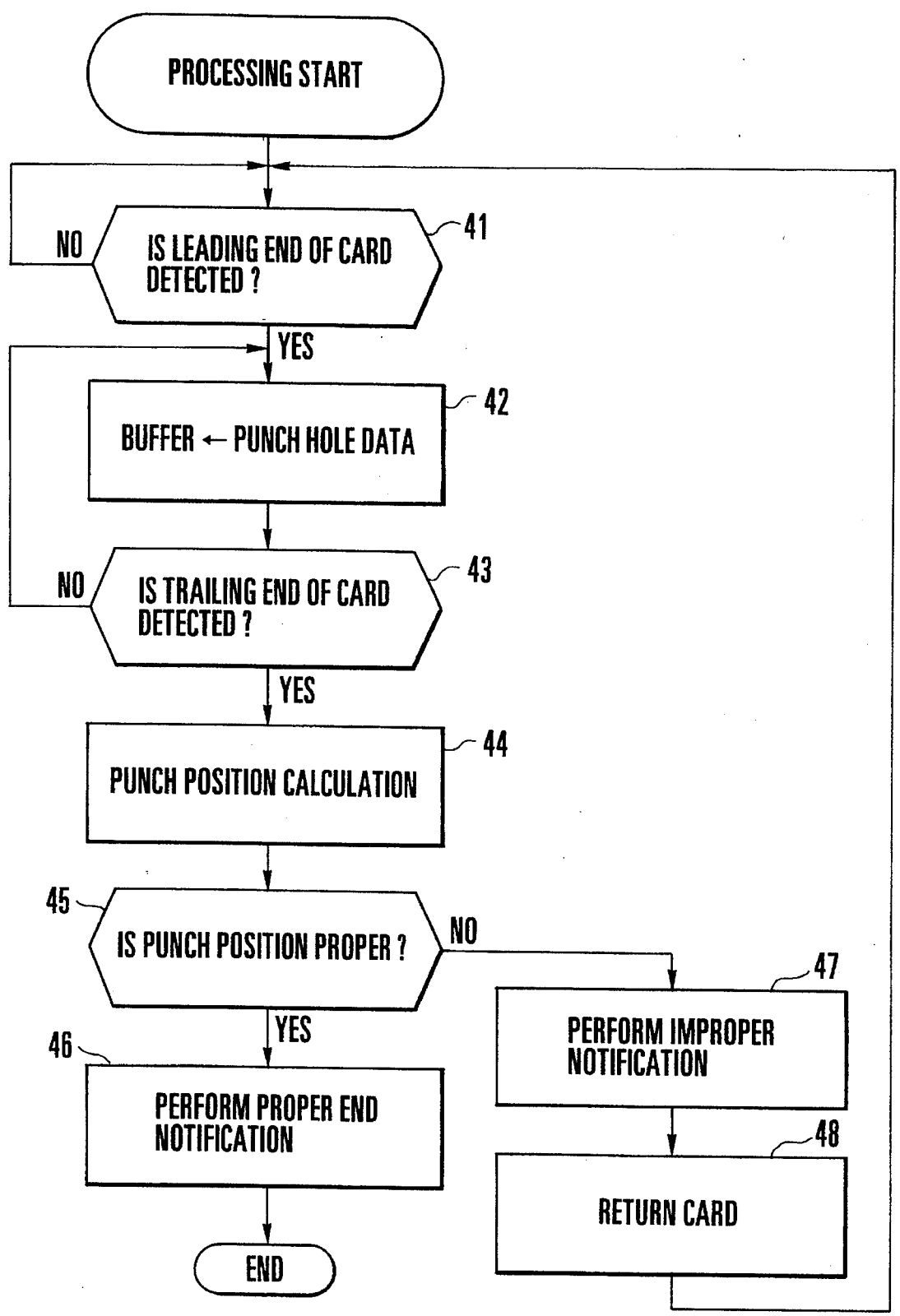
FIG. 4 is a flow chart showing a control operation of the magnetic card reader/writer apparatus in FIG. 1.
Figure 5:
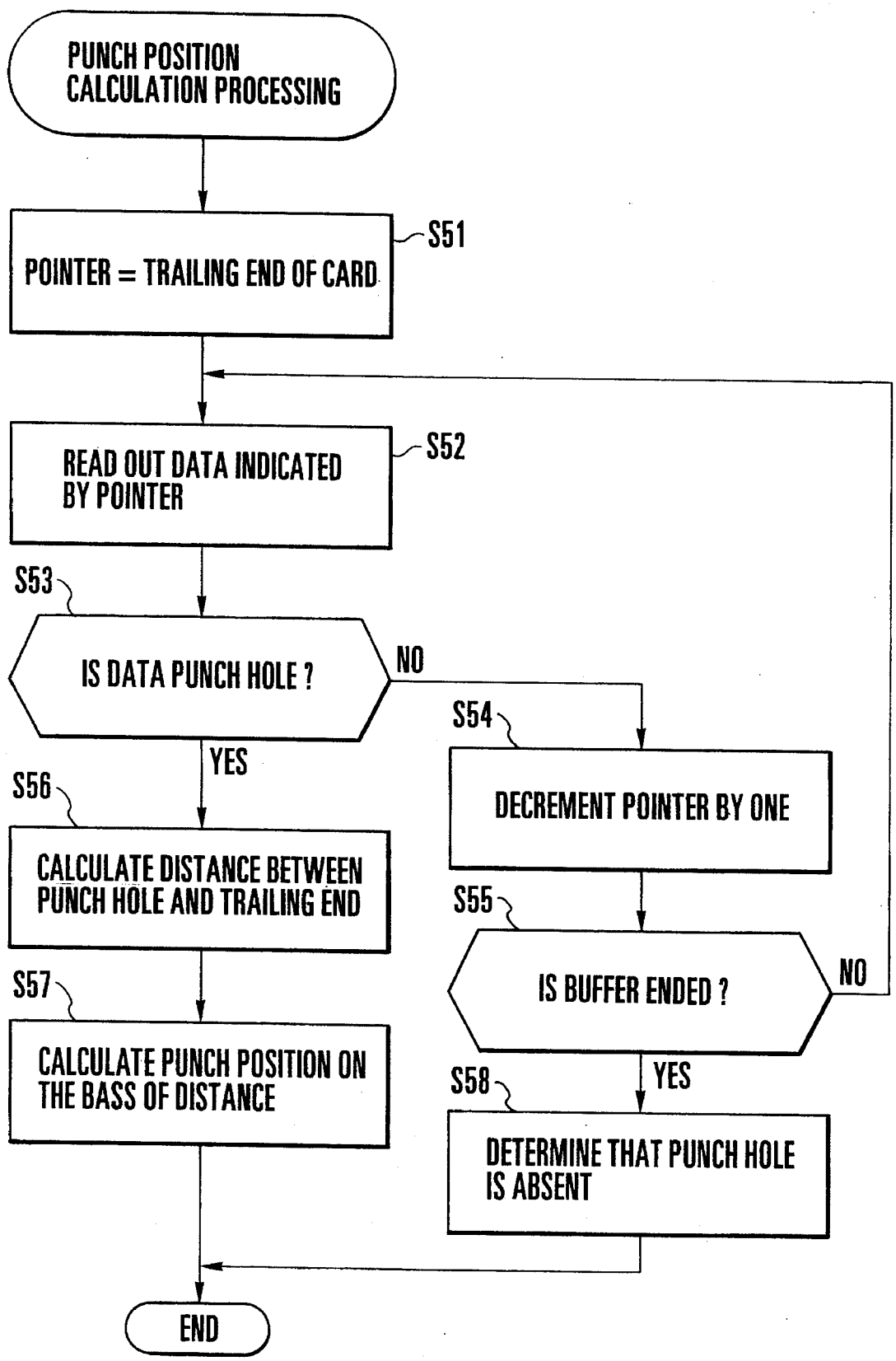
FIG. 5 is a flow chart showing a punch position calculation operation in FIG. 4.
Figure 6:
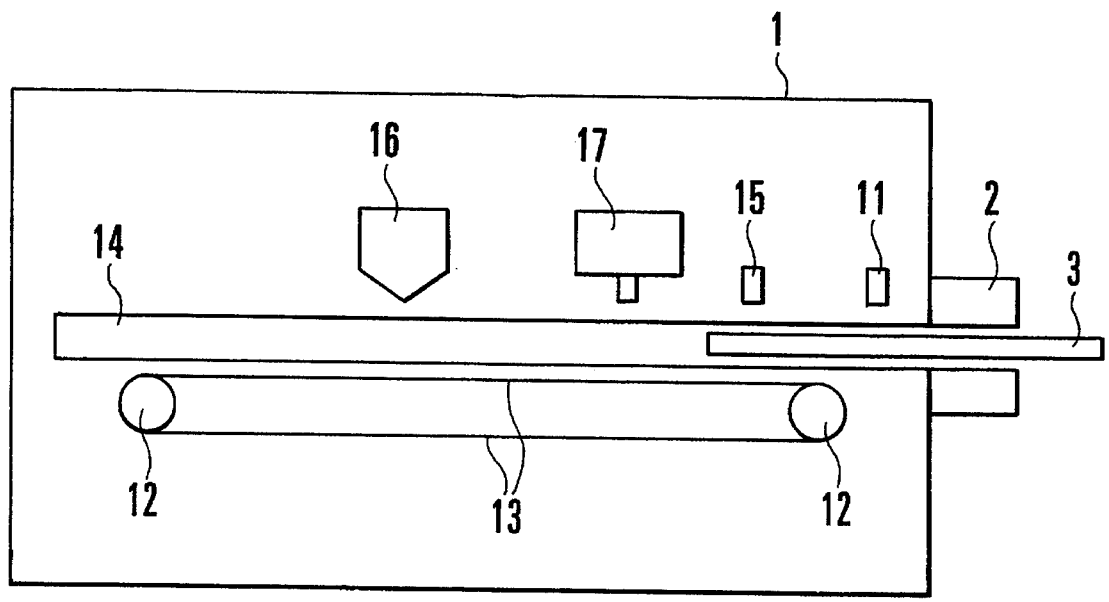
FIG. 6 is a schematic view showing the arrangement of a conventional magnetic card reader/writer apparatus.

FIGS. 4 and 5 show an operation of the control circuit 118 for detecting punch hole data of the card 103. A punch hole data detection operation of the control circuit 118 will be described below detail with reference to the flow chart in FIG. 4.

When the card 103 is inserted in the insertion port 102, and the leading end portion of the card 103 is detected by the insertion detection sensor 111, the control circuit 118 drives the motor 122 to feed the card 103 into the convey path 114 at a predetermined speed. In step S41, it is checked whether the leading end portion of the card 103 is detected by the punch hole detection sensor 115. When a detection output from the punch hole detection sensor 115 is changed from "1" to "0" to detect the leading end portion of the card 103, sampling data of the card 103 are sequentially stored in the buffer 128*a* in step S42.

The sampling data are sequentially input through the punch hole detection sensor 115 at a predetermined time interval until the trailing end portion of the card 103 is detected by the punch hole detection sensor 115, and the sampling data are stored in the buffer 128*a*. When the detection output from the punch hole detection sensor 115 is switched to "1" successive from "0" step S43, the trailing end portion of the card 103 is detected. In step S44, punch position calculation processing (to be described later in FIG. 5) is executed on the basis of the sampling data stored in the buffer 128*a*.

In step S45, on the basis of the result of the punch position calculation processing in step S44, it is checked whether a punch position is properly detected. If the detection is properly performed, the proper end is notified to the control unit 124 through the transmission/reception circuit 125 in step S46. If the punch position is not properly detected, improper notification is performed for the control unit 124 in step S47, and the card 103 is returned in step S48.

The punch position calculation processing which is a characteristic feature of the present invention will be described below with reference to the flow chart in FIG. 5. When all the sampling data are stored in the buffer 128a, the reading unit 118a of the control circuit 118 sets the value of a pointer in a data area, corresponding to the trailing end of the card 103, in the buffer 128a in step S51. In step S52, data indicated by this pointer is read out. The detection unit 118b checks in step S53 whether this readout data is punch hole data "1".

If NO in step S53, the reading unit 118a decrements the value of the pointer by one in step S54. At the same time, it is checked in step S55 that the read operation of the data from the buffer 128a is not ended, and the flow returns to step S52. In step S52, data indicated by the pointer having a data decremented in step S54 is read out from the buffer 128a. The detection unit 118b checks in step S53 whether the readout data is the punch hole data "1".

In this manner, first, the value of the pointer is set in the area, of the buffer 128a, corresponding to the sampling data corresponding to the trailing end portion of the card, and sampling data indicated by the pointer while the value of the pointer is decremented one by one to check whether the data are the punch hole data "1". Thereafter, if YES in step S53, the calculation unit 118c calculates the distance between the trailing end portion of the card 103 and the punch hole on the basis of the value of a pointer obtained at this time in step S56.

More specifically, the card 103 is conveyed at a predetermined speed on the convey path 114 by the convey belt 113, and sampling data for sampling punch holes are received by the buffer 128a at a predetermined time interval. For these reasons, on the basis of the difference between the value of the pointer set in step S51 and the value of the pointer obtained when the punch hole data "1" is detected, the calculation unit 118c can accurately calculate the distance between the punch hole and the trailing end portion of the card. In step S57, a punch position is calculated on the basis of the distance calculated as described above. In this manner, the processing is ended.

In a searching operation performed for all the sampling data stored in the buffer 128a in step S55, when no punch hole data "1" is detected, it is determined in step S58 that a punch hole is absent, and the processing is ended.

The sampling data sequentially stored in the buffer from the sampling data of the leading end portion of the card are searched from the trailing end side of the card, the first detected punch hole data is defined as the balance information of the card. As a result, the balance information can be accurately detected, and the overall length of the apparatus can be shortened with respect to the card length.

As has been described above, according to the present invention, when the balance of the card is to be detected on the basis of sampling data stored in the buffer, the sampling data sequentially stored from sampling data corresponding to the leading end portion of the card are sequentially read from sampling data corresponding to the trailing end portion of the card to detect punch hole data, and the balance of the card is detected on the basis of the detected punch hole data. For this reason, even if the punch hole data on the leading end side of the card is not properly stored in the buffer because the trailing end portion of the card is temporarily held by a user in insertion of the card, a punch hole position can be accurately detected. Therefore, accurate balance information can be obtained. As a result, a proper card can be prevented from being erroneously determined as a counterfeit card. In addition, the overall length of the apparatus can be shortened with respect to the card length.

The buffer is constituted to have a ring structure. For this reason, when the trailing end portion of the card is held by a user for a relatively long period of time in insertion of the card, and then released to be received into the apparatus, the sampling data can be reliably stored in the buffer.

What is claimed is:

1. A magnetic card reader apparatus comprising:

convey means for conveying an inserted prepaid card at a predetermined speed, said prepaid card having a punch hole formed at a position corresponding to balance information;

sensor means for sampling the punch hole of said prepaid card during conveying of said prepaid card at a predetermined time interval from a leading end side of said prepaid card;

memory means for storing sampling data output from said sensor means;

reading means for sequentially reading out the sampling data stored in said memory means from sampling data corresponding to a trailing end portion of said prepaid card;

detection means for detecting data first representing a punch hole from the sampling data read out from said memory means; and calculation means for calculating a position of the punch hole on the basis of a detection output from said detection means to detect the balance information of said prepaid card.

2. An apparatus according to claim 1, wherein said memory means is constituted by a ring buffer having a ring structure, and, when said ring buffer is filled during storage of the sampling data, sampling data corresponding to the leading end portion of said prepaid card are sequentially overwritten on the first stored sampling data corresponding to the trailing end portion of said prepaid card.

3. An apparatus according to claim 2, wherein said reading means sets a value of a pointer in a storage area for sampling data corresponding to a most trailing end portion of said prepaid card and decrements the value of the pointer one by one in a ring to read out the sampling data stored in the ring buffer.

4. An apparatus according to claim 1, further comprising a magnetic head for magnetically recording/reproducing information, and wherein said prepaid card is constituted by a magnetic card having balance information magnetically recorded/reproduced by said magnetic head.

5. An apparatus according to claim 4, further comprising determination means for determining said prepaid card as a proper card when a balance based on a punch hole calculated by said calculation means is not less than a balance based on magnetic information read by said magnetic head, and determining said prepaid card as an illegal card when the balance based on the punch hole calculated by said calculation means is less than the balance based on the magnetic information read by said magnetic head, and returning means for returning said prepaid card which is determined as the illegal card by said determination means.

6. An apparatus according to claim 1, wherein said sensor means starts a sampling operation when the leading end portion of said prepaid card is detected, and ends the sampling operation when the trailing end portion of said card is detected.

7. An apparatus according to claim 1, wherein said calculation means calculates a distance between said prepaid card and a detected punch hole on the basis of the sampling data first representing a punch hole detected by said detection means, and a position at which the punch hole is formed is calculated on the basis of the calculated distance.

8. An apparatus according to claim 1, wherein said sensor means is arranged on a convey path near an insertion port, and a distance between said sensor means and the insertion port is set to be shorter than an overall length of said prepaid card.

9. An apparatus according to claim 1, further comprising punching means for forming a punch hole at a position corresponding to a balance after settlement of said prepaid card on the basis of the position of the punch hole calculated by said calculation means.

* * * * *

UNITED STATES PATENT AND TRADEMARK OFFICE
CERTIFICATE OF CORRECTION

PATENT NO. : 5,545,884

DATED : August 13, 1996

INVENTOR(S) : Seto et al.

It is certified that error appears in the above-identified patent and that said Letters Patent is hereby corrected as shown below:

Please delete Fig. 1 of the drawing sheets and insert the attached Fig. 1.

Signed and Sealed this

Second Day of September, 1997

Attest:

*Attesting Officer*

BRUCE LEHMAN

*Commissioner of Patents and Trademarks*